March 21, 1967 M. R. SCHULTZ 3,310,343

FURNITURE

Filed Nov. 8, 1965 7 Sheets-Sheet 1

INVENTOR.
M. R. SCHULTZ
BY Lester W. Clark
ATTORNEY

INVENTOR.
M. R. SCHULTZ
BY
Lester W. Clark
ATTORNEY

FURNITURE

Filed Nov. 8, 1965 7 Sheets-Sheet 3

INVENTOR.
M. R. SCHULTZ
BY
Lester W. Clark
ATTORNEY

INVENTOR.
M. R. SCHULTZ
BY
Lester W. Clark
ATTORNEY

INVENTOR.
M. R. SCHULTZ
BY
Lester W. Clark
ATTORNEY

INVENTOR.
M. R. SCHULTZ
BY
Lester W. Clark
ATTORNEY

March 21, 1967 M. R. SCHULTZ 3,310,343
FURNITURE
Filed Nov. 8, 1965 7 Sheets-Sheet 7

INVENTOR.
M. R. SCHULTZ
BY
Lester W. Clark
ATTORNEY

United States Patent Office 3,310,343

Patented Mar. 21, 1967

3,310,343

FURNITURE

Moses Richard Schultz, Barto, Pa., assignor to Knoll Associates, Inc., New York, N.Y., a corporation of New York Filed Nov. 8, 1965, Ser. No. 506,823

22 Claims. (Cl. 297—445)

This invention relates to new and useful improvements in furniture, such as chairs, chaises, lounges and the like, and in the manufacture and upholstery thereof. In particular, the furniture has a construction which lends to ease and economy of manufacture, which is aesthetically pleasing, and which is strong and highly durable, and resistant to adverse atmospheric conditions, rendering it ideally suitable as outdoor furniture.

In the manufacture of outdoor furniture, it is desirable to provide a structure which is light in weight, permitting its being readily moved about to various locations, and which has an airy, or open design, enhancing its appearance in outdoor surroundings. Such furniture, of course, is usable in either an indoor or a controlled environment; however, since it is intended for use in outdoor settings, it is necessary that the furniture be capable of withstanding adverse weather conditions, such as moisture, heat and direct sunlight, without being deleteriously affected either in its construction strength or in its appearance.

It is therefore an object of this invention to provide furniture of an improved construction which is aesthetically pleasing in appearance.

Another object is to provide furniture of an improved construction which is structurally sturdy and which can withstand adverse conditions of outdoor weather.

Still another object of this invention is to provide furniture having an improved construction which lends to ease and economy of manufacture.

Still a further object of this invention is to provide upholstered furniture having an improved, sturdy construction which lends to ease and economy of manufacture and which can withstand the adverse effects of outdoor weather.

Other objects and advantages of this invention will become apparent as the following description proceeds.

In accordance with the preferred embodiment of the invention, the furniture includes a body-supporting structure which is mounted on a rigid base frame. The body-supporting structure includes a pair of elongated, stiffly flexible bands which are preformed to define the longitudinal or side edges of the contour of the body-supporting structure, for example, to define a back and a seat of a chair. A continuous length of webbing, having an elongated pocket along each of its opposite longitudinal edges, receives one of the bands in each of the pockets. A spreader bar is secured at its opposite ends to the bands, for example at the juncture of the back and the seat. The spreader bar holds the bands in spaced, generally parallel relationship to place the webbing under lateral tension. The spreader bar may be connected to the middle of the webbing in any of several ways. For example, in one embodiment, a transverse pocket is provided on the bottom surface of the webbing and the spreader bar is received in the pocket. The spreader bar is contoured to place the webbing under lateral tension, whereby it is held in taut condition. The body-supporting structure may include one or more spreader bars and may be made of any contour desired by suitable preforming of the bands. The body-supporting structure is mounted on a rigid base frame at two or more connections between each of the bands and the base frame to complete the assembly of the furniture. The base frame of the furniture of the invention is constructed to facilitate the mounting of the body-supporting structure on it and to contribute to the pleasing appearance of the furniture. It consists of vertical, cast legs and horizontal stretchers which are sometimes cast with the legs and sometimes formed from separate tubing pieces attached to the legs by suitable connections.

For a better understanding of the invention, reference may be had to the following description and drawings in which:

FIG. 16 is a sectional view taken on the line 16—16 of FIG. 14;

*FIGS. 1 to 13*

Figures 1, 2:
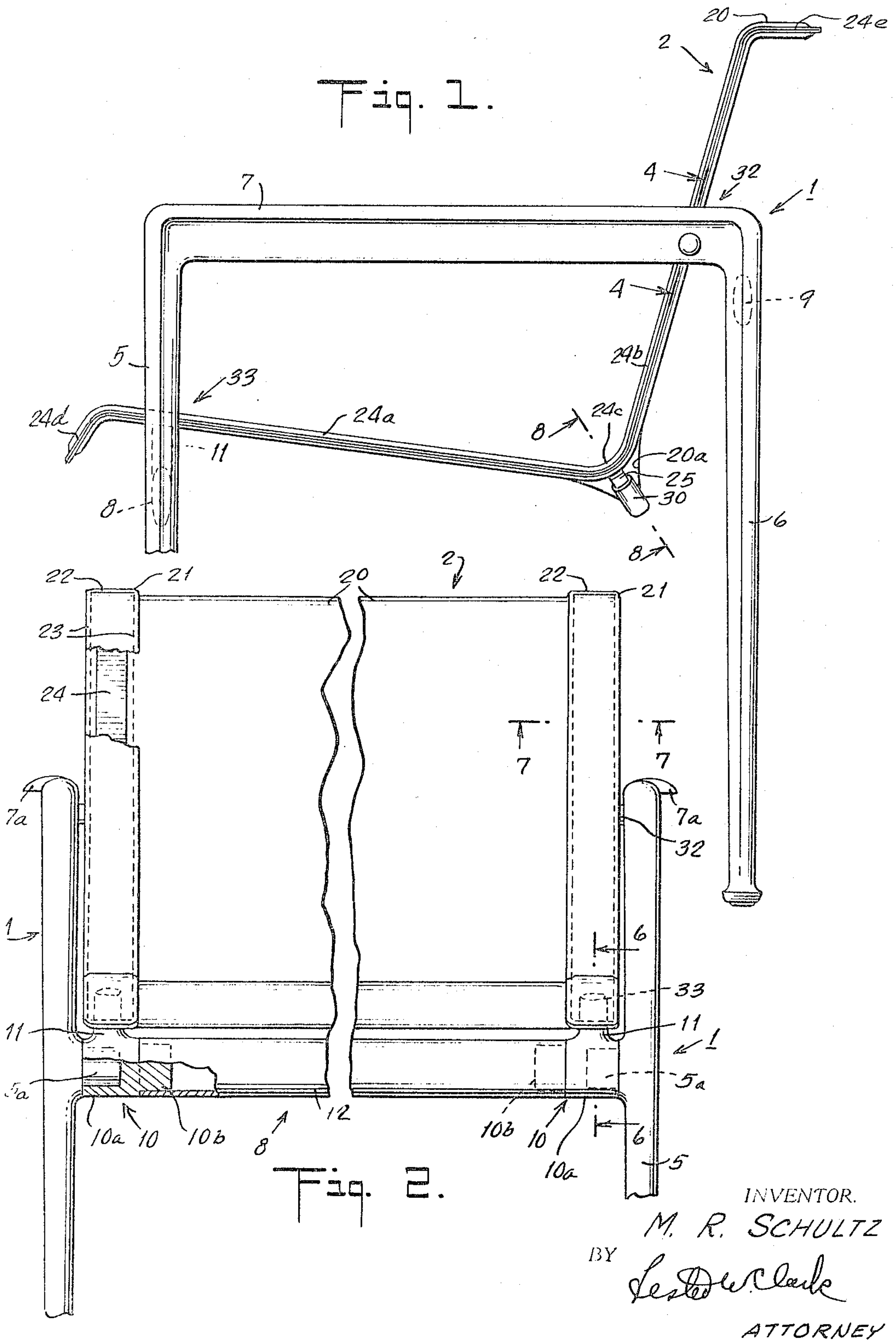
FIG. 1 is a side elevational view of a chair constructed in accordance with the invention, with one leg broken away.
FIG. 2 is a front elevational view of the chair of FIG. 1.

FIGS. 1 to 13 show an arm chair constructed in accordance with a first embodiment of the invention and incorporating principal features of the invention. As best shown in FIGS. 1 and 2, the chair includes a rigid base frame 1, preferably cast of metal, such as an aluminum alloy, and a body-supporting structure 2 which is secured to the base frame 1.

Figures 3, 4, 5, 6, 7:
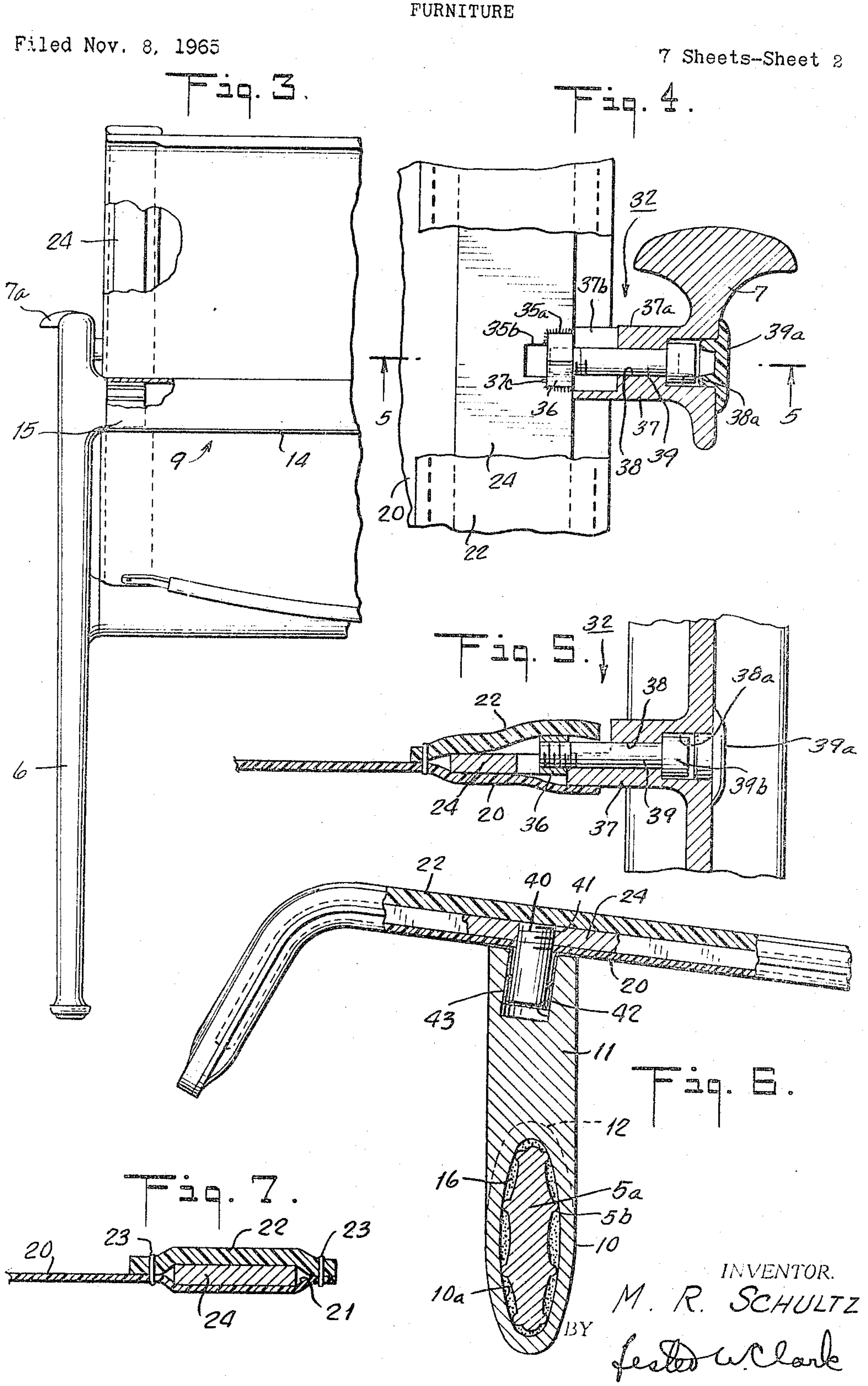
FIG. 3 is a fragmentary rear elevational view of the chair of FIG. 1.
FIG. 4 is a fragmentary sectional view taken on the line 4—4 of FIG. 1.
FIG. 5 is a fragmentary sectional view taken on the line 5—5 of FIG. 4.
FIG. 6 is a fragmentary view taken on line 6—6 of FIG. 2.
FIG. 7 is a fragmentary view taken on the line 7—7 of FIG. 2.
Figure 8:
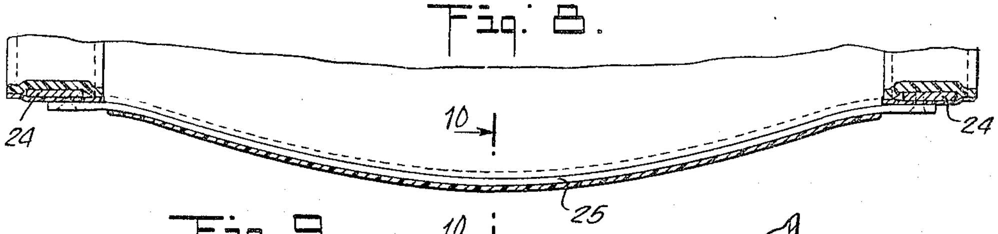
FIG. 8 is a sectional view taken on the line 8—8 of FIG. 1.

Referring to FIGS. 1 to 3, the base frame 1 includes vertical front legs 5 and rear legs 6, the front and rear legs 5 and 6 on each side of the chair being joined by an arm rest 7. Preferably, each arm rest 7 is cast integrally with its associated legs 5 and 6 and extends generally horizontally therebetween, the legs 5 and 6 and arm rest 7 providing an integral side frame. The arm rest 7 includes a flange 7*a* at the outer side of its upper surface, to provide greater lateral surface area on the arm rest for the comfort of the chair occupant.

The front pair of legs 5 and the rear pair of legs 6 are joined by front and rear stretchers 8 and 9, respectively. The front stretcher 8 includes a pair of cast metal sockets 10 each having a generally elliptical recess 10*a* at one end and a generally elliptical stud 10*b* at the other end. The stud 10*b* is preferably of smaller dimensions than the main body portion of the socket 10. Each of the sockets 10 also includes an integrally cast, generally vertical extension arm 11. If desired, the legs 5 may be cast to include an integral, laterally extending element having the exterior configuration of the socket 10 and thus including a vertical extension arm 11 and a stud 10*b*. Generally, it is less complicated and less expensive to mold the socket 10 separately, and thereafter join it to a leg 5, as described below in connection with FIG. 6.

The front lateral cross bar 8 further includes a hollow metal tube 12, which may conveniently be an aluminum extrusion. The tube 12 is of generally elliptical cross section and has interior dimensions slightly larger than the exterior dimensions of the elliptical studs 10*b*. Each of the opposite ends of the tube 12 is received snugly over a corresponding stud 10*b*. The exterior dimensions of tube 12 are desirably identical to those of the main body portion of the sockets 10 to provide a smooth, seamless exterior surface at their juncture. The front legs 5 include studs 5*a* of generally elliptical cross section which extend laterally in opposed, or axially aligned, relationship from the legs 5. The recesses 10*a* of the sockets 10 are received over the studs 5*a* to join the legs 5 together in a rigid construction.

The rear lateral crossbar 9 is best seen in FIG. 3 and includes a hollow tube 14 of generally elliptical cross section, and conveniently formed as an aluminum extrusion. Each of the rear legs 6 (only one of which is shown) includes a stud 15 of generally elliptical cross section extending laterally in opposed, or axially aligned, relationship with a stud 15 on the other rear leg 6. Opposite ends of the hollow tube 14 are fitted snugly over the studs 15 to join the rear legs 6 together in a rigid construction.

The securing of the ends of the hollow tubes 12 and 14 to their respectively associated studs 10*b* and 15, and of the socket members 10 to their respectively associated leg studs 5*a* is best performed in accordance with the technique illustrated most clearly in the enlarged sectional view of FIG. 6. FIG. 6 shows, in section, the recess 10*a* of the socket 10 and the leg stud 5*a* of a front leg 5 of the base frame 1. The exterior surface of the stud 5*a* is generally elliptical; however, a plurality of ribs 5*b* are formed on its surface. The ribs 5*b* separate concave grooves on the surface of the stud 5*a*, which grooves provide spaces between the stud and the walls of the socket 10 which surround the recess 10*a*. The ribs 5*b* thus formed allow greater manufacturing tolerances in forming the stud 5*a* and the recess 10*a* of socket 10, while facilitating their assembly. The ribs 5*b* may be made slightly oversize, and will be deformed during assembly, thus providing a tight fit. In addition, the recesses between the ribs 5*b* provide a space for receiving an adhesive, preferably an epoxy resin, as indicated at 16 for permanently securing the assembly.

Upon adhesively joining all of the base frame elements together in this manner, the base frame 1 is extremely sturdy and rigid. Usually, the surfaces of all of the base frame elements are coated with paint or other suitable coating material to provide a desired color to the frame. The coating should be thick enough to fill and effectively conceal the joints between the several parts, as between socket 10 and leg 5. The coating is also desirable to prevent the metal of the frame elements from being rusted or otherwise deleteriously affected by moisture to which the furniture is normally subjected in outdoor use.

The elliptical cross section of various of the elements is not absolutely necessary, and elements having other cross sections may be employed. However, an elliptical cross section with its long axis vertical provides maximum strength in a vertical direction, as is required, while minimizing the total material in the elements and thus reducing the weight and cost of the elements. The elliptical cross section is also generally aesthetically pleasing in appearance in structures of this type.

The connection described above, namely, involving a hollow tube and a stud having a plurality of ribs on its surface, is disclosed and claimed in an application of this inventor filed concurrently herewith for Furniture Connection (Ser. No. 506,760, filed Nov. 8, 1965).

The body-supporting structure 2 includes a continuous, single length of webbing 20 having a pair of pockets 21 extending along its opposite longitudinal edges for substantially its entire length. Each pocket 21 preferably is formed by securing a relatively narrow strip 22 of heavy material along an edge of the webbing 20 as by stitching or heat sealing of the strips 22 along their opposite edges to the webbing 20, as indicated at 23. See FIG. 7. The webbing 20 preferably is an open weave or mesh formed from nylon, any of various plastics, or the like, which resists the effects of moisture, sunlight, and other adverse environmental conditions. Although the webbing 20 preferably is somewhat resilient under tension, it should not readily acquire a permanent set. The strips 22 are preferably of a heavier gauge, solid material which likewise resists adverse environmental conditions; suitably treated leather, nylon, and any of various plastics are suitable.

A pair of stiffly flexible, metal bands 24 are received in corresponding ones of the pair of pockets 21, extending substantially throughout the length of the webbing 20. Preferably, the bands 24 are of steel and are plated with nickel to prevent rusting.

The bands 24 are bent or preformed in an identical manner to define a desired contour or configuration to the body-supporting structure 2 of the chair. Thus, in FIG. 1, the bands 24 define a seat 24*a* and a back 24*b* joined by an arcuate section 24*c*. The bands 24 preferably are bent downwardly to provide a downward lip 24*d* at the front edge of the seat 24*a* and a rearward horizontal lip 24*e* at the top of the back 24*b*.

In order to maintain the webbing 20 under longitudinal tension throughout its length, and particularly near its ends, the fabric is cut slightly shorter than the length of the bands 24. The strips 22, cut to the same length as the webbing, are then sewed or otherwise fastened to the webbing to form the pockets 21. This sewing or other fastening includes the closing of the ends of the pockets. A slit is then cut across the webbing side of the pocket about ¾ of an inch from one end, and the steel band is then slipped endwise through that slit into the pocket and toward the other end thereof. When the leading end of the steel band reaches the closed end of the pocket, the uncovered end of the steel band will extend outside the pocket by a distance somewhat longer than the three-fourths of an inch between the slit and the end of the pocket. This end of the band is inserted in the pocket by using a suitable hand tool in the manner of a shoehorn. This operation stretches the whole webbing from one end to the other and ensures that the webbing will not develop a sag while a person is seated in the chair in such a manner that the sag remains after the person leaves the chair. The strips 22 are also longitudinally stretched during this operation of insertion of the band. If necessary, the slit can be closed after the band is inserted, either by sewing or by an adhesive patch of material similar to the webbing.

The width of the fabric 20, when cut, is made equal to the distance between the outer edges of the band 24 in the finished chair. Since the edges of the webbing extend beyond the outer edges of the bands, the webbing is necessarily stretched laterally when the bands are mounted on the base frame.

With reference to FIGS. 1, 2, 3 and 8 to 10, the webbing 20 is placed under lateral tension, in the region where the seat *24a* joins the back *24b*, by a spreader bar 25. The spreader bar 25 may be formed of metal, such as nickel-plated steel, and is of simple rectangular cross section. The spreader bar 25 extends transversely between and is joined at its opposite ends to the bands 24. A tapped hole 26 (FIG. 9) is provided in each of the bands 24 and a self-locking screw 27 extends through a countersunk aperture 28 in each end of the spreader bar 25 and through the webbing 20 to engage the tapped hole 26 in the band 24.

Figure 9:
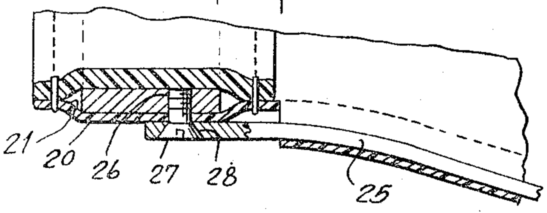
FIG. 9 is a fragmentary sectional view on the line 8—8 of FIG. 1 showing on an enlarged scale a left-hand portion of the view of FIG. 8.
Figure 10:
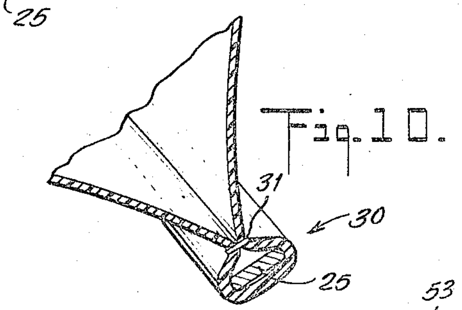
FIG. 10 is a fragmentary sectional view on the line 10—10 of FIG. 8.

The spreader bar 25 also serves to produce longitudinal tautness in the webbing 20 and for this purpose is preformed in an arcuate, or curved shape. A sleeve 30 is provided in the webbing 20 in the region of the arcuate section *24c*, and the spreader bar 25 is received within the sleeve 30. Due to its arcuate configuration, the bar 25 extends below the bands 24 and forms a dimple *20a* in the webbing 20. As shown in FIG. 10, the sleeve 30 may be formed by stitching together the material of the webbing 20, as indicated by the row of stitching 31. The ends of the sleeve are cut away, as shown in FIG. 9, so that there is an opening in the under side of the pocket 21 at that locality.

The body-supporting structure 2 is connected to the base frame 1 on each side at two places, generally indicated in FIGS. 1 and 2 as a rear connection 32 to the arm rest 7 and a front connection 33 to the vertical extension arm 11.

The rear connection 32 is illustrated in detail in FIGS. 4 and 5. A notch including a wide portion *35a* and a narrow portion *35b* is cut in the steel band 24. A nut 36 is received in the wide portion *35a* and soldered to the steel band 24, as indicated by weld bead *37c*. The axis of the nut 36 is parallel to the surface of the steel band 24. A connection boss 37 is integrally cast in the arm rest 7 and extends horizontally or laterally inwardly toward the steel band 24 of the body-supporting structure 2. The boss 37 includes a general cylindrical portion *37a* and a cut-away portion *37b*. The cut-away portion *37b* abuts a front edge of the nut 36. An aperture 38 extends through the connection boss 37 and has an enlarged portion *38a* adjacent the outer surface of the arm rest 7. A bolt 39 extends through the aperture 38 with its head *39b* received within the enlarged portion *38a*. The bolt 39 is threaded into the nut 36 and secures the steel band 24 to the arm rest 7. The narrow portion *35b* of the notch is provided to accommodate the end of the bolt 39. The strip 22 and the webbing 20 are separated at their outer edges for a short distance and fitted about the connection 32 as shown in FIG. 5. A plastic plug *39a* is fitted into the enlarged recess *38a* and includes a lateral flange closely engaging the outer surface of the arm rest 7 to conceal the head of bolt 39.

The front connection 33 is best shown in FIG. 6. A threaded stud 40 is secured to the band 24, preferably by engaging a threaded aperture 41 in the band 24. The stud 40 extends generally perpendicularly downwardly from the band 24, passing through an opening in the mesh of the underlying webbing 20. An aperture 42 is provided in the vertical extension arm 11 in axial alignment with the stud 40. A conventional toothed, expansible fastening element 43 of cylindrical configuration is received in the aperture 42. The stud 40 is forced into the aperture 42, and the fastening element 43 bites into the surfaces of both the stud 40 and the walls of the arm 11 surrounding the aperture 42, thereby securely locking the band 24 to the arm 11.

It will be readily appreciated that the assembly of the chair of the preceding figures requires a minimum of effort and can be accomplished with standard tools in a minimum of time. Furthermore, the elements of the chair construction, including both the base frame 1 and the body-supporting structure 2 are of extremely simple configurations and can be manufactured in mass production at low cost. The chair is of very sturdy construction while maintaining a light, airy appearance which is of great aesthetic appeal. Further, the chair may be kept out of doors without being deleteriously affected either in its appearance or its structural strength. The webbing 20 and the strips 22 may be of any suitable material and any desired color and may blend with or contrast with the color of the base frame 1, thereby providing a wide range of color combinations.

Figures 11, 12, 13:
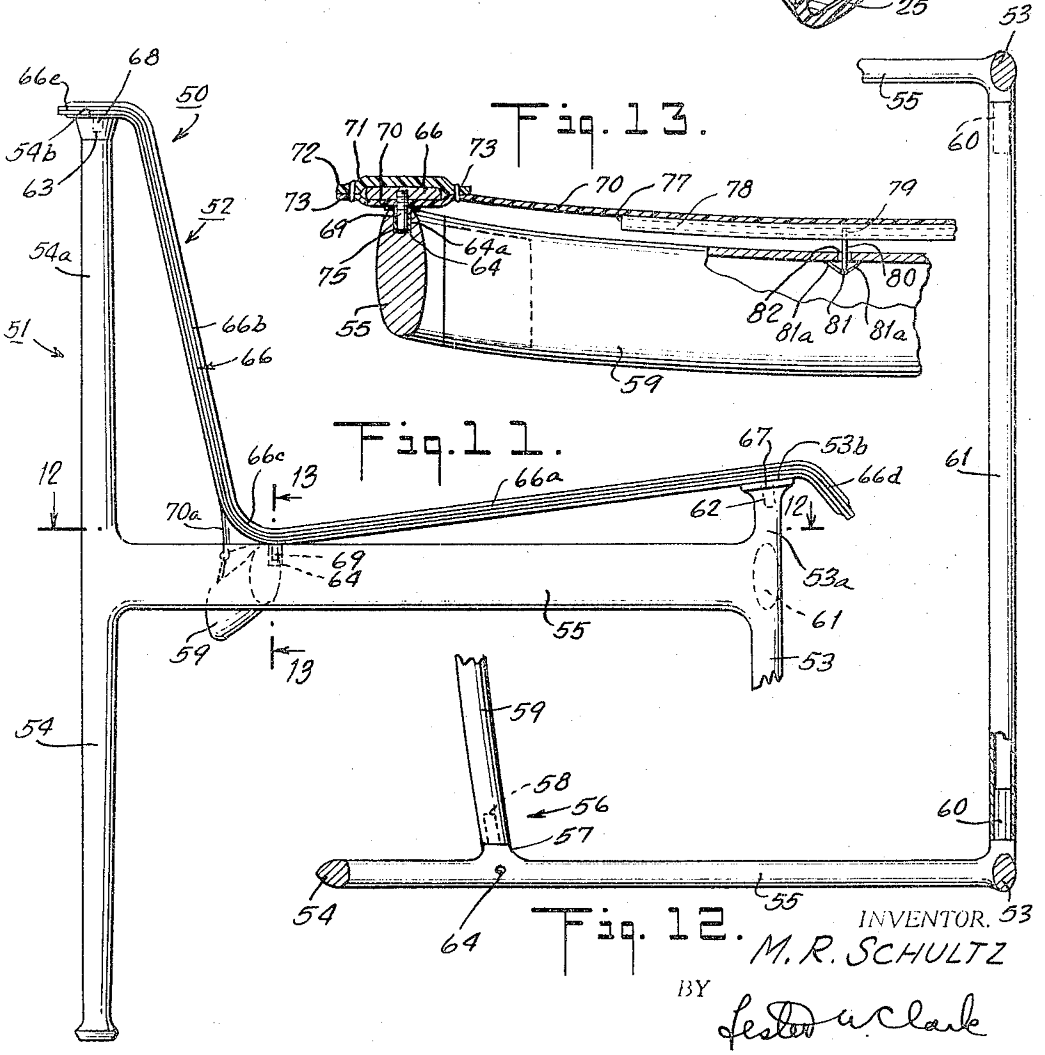
FIG. 11 is a side elevational view, with one leg broken away, of a chair constructed in accordance with a second embodiment of the invention.
FIG. 12 is a fragmentary sectional view taken on the line 12—12 of FIG. 11.
FIG. 13 is a fragmentary sectional view taken on the line 13—13 of FIG. 11.

*FIGS. 11 to 13*

A chair constructed in accordance with a second embodiment of the invention is shown in FIGS. 11 to 13. The chair 50 incorporates the major features of the invention, as described above, and includes a base frame 51 and a body-supporting structure 52 which is mounted on the base frame 51.

The base frame 51 includes a pair of front legs 53 and a pair of rear legs 54 joined by longitudinal stretchers 55. Preferably, each longitudinal stretcher 55 is cast integrally with its respectively associated front and rear legs 53 and 54 to provide an integral side frame. Disposed toward the rear, and projecting from the inner surface of each of the longitudinal stretchers 55 is a connection element 56 comprising a contoured shank 57 and a stud 58. The stud 58 is preferably of elliptical configuration and of reduced dimensions relatively to the shank 57. A hollow spreader bar 59 of generally elliptical cross section receives the studs 58 in its opposite ends to connect the cross bars 55. The outer dimensions of the spreader bar 59 correspond to those of the contoured shank 57 to effect a flush or continuous surface at the juncture. The spreader bar 59 is contoured in a gently curving arc extending both rearwardly and downwardly from the shanks 57 on the longitudinal cross bars 55.

Each of the front legs 53 includes a stud 60 extending laterally in aligned, or opposed relationship to the other stud 60. A hollow, front stretcher 61 is positioned with its opposite ends received over the studs 60 to connect the front legs 53. Preferably, the front stretcher 61 is straight, and of an elliptical cross section; the studs 60 likewise are of elliptical cross section but of slightly smaller dimensions than the interior dimensions of the stretcher 61. The outer surface of the stretcher 61 conforms to that of the legs 53 at their juncture to provide a flush or smooth contour.

The studs 58 and 60 include ribs, in accordance with the technique described above in connection with FIG. 6 to facilitate the assembly therewith of the contoured spreader bar 59 and the horizontal stretcher 61, respectively, and to enable the effective application of an adhesive therebetween. A thick paint, plastic or other suitable protective coating may be applied over the junctures, or over the entire frame, to render it water-resistant and also to improve its appearance.

The front legs 53 each include a vertical extension 53*a* projecting above the longitudinal stretchers 55 and having an enlarged, rearwardly inclined mounting surface 53*b* at its upper end. Similarly, the rear legs 54 each include a vertical extension 54*a* of substantially greater length than the extensions 53*a* and having an enlarged, generally horizontal mounting surface 54*b*. The mounting surfaces 53*b* and 54*b* include apertures 62 and 63 in which fastener elements are received for securing the body-supporting structure 52 to the base frame 51. An aperture 64 is formed in each of the longitudinal stretchers 55 adjacent the shanks 57 in which a fastening element is received to provide a third point of connection between the body-supporting structure 52 and the base frame 51.

The body-supporting structure 52 is constructed in a similar manner to the body-supporting structure 2 of the chair shown in FIGS. 1 through 10. A pair of steel bands 66 (only one of which is shown) is preformed to define the desired contour of the body-supporting structure 52. The bands 66 define a seat 66*a* and a back 66*b* joined by an arcuate section 66*c*, a downward lip 66*d* at the front edge of the seat 66*a* and a rearward, horizontal lip 66*e* at the top of the back 66*b*.

As shown in FIG. 13, a continuous length of webbing 70 extends between and is joined to the steel bands 66. The webbing 70 includes a pair of longitudinal pockets 71 on its opposite longitudinal edges (only one of which is shown) within each of which an associated band 66 is received. Each pocket 71 is formed by a strip 72, preferably of a heavier material than the webbing 70, which is secured to the webbing 70 along one of its longitudinal edges, for example, by the rows of stitching 73.

Connecting pegs 67 to 69 are secured to each of the steel bands 66 in displaced positions, the peg 67 extending vertically downwardly from the seat 66*a* near the front and adjacent the lip 66*d*, the peg 68 extending vertically downwardly from the rearward lip 66*e*, and the peg 69 extending vertically downwardly from the rear of the seat 66*a*, adjacent the arcuate section 66*c*.

The body-supporting structure 52 is secured to the base frame 51 by the connecting pegs 67 to 69. FIG. 13 illustrates the details of the connection including the peg 69. The connecting peg 69 extends through the webbing 70 on the under surface of the band 66 and is threaded into an aperture provided for this purpose in the band 66. A conventional toothed fastening element 64*a* is received within the aperture 64. When the peg 69 is pressed downwardly into the aperture 64, the fastening element 64*a* bites into the peg 69 and into the interior walls surrounding the aperture 64 to securely lock the peg 69 to the crossbar 55.

The joining of the steel bands 66 to the base frame 51 maintains the bands 66 in generally parallel, spaced relationship. The webbing 70 is thereby placed under lateral tension and conforms to the desired contour of the body-supporting structure 52. The webbing 70 is further placed under longitudinal tension by being dimpled, as at 70*a*, in the region of the arcuate section 66*c*.

In the chair 50, the spreader bar 59 of the base frame 51 is contoured to enable its performing a dual function: (1) as a stretcher of the frame 51; and (2) as a part of the mechanism in the body-supporting structure 52 which provides for dimpling the webbing 70. As best shown in FIG. 13, a sleeve 77 is secured to the under surface of the webbing 70 and extends transversely between the steel bands 66 for a substantial portion of the width of the webbing 70. A steel rod 78 is bent to define the desired contour of the dimple 70*a* and is received within the sleeve 77. A cord 80 is threaded through openings provided in the sleeve 77 and an aligned aperture 79 in the steel rod 78. The cord 80 is also attached to an expansible fastener 81. An aperture 82 is provided in the hollow spreader bar 59 through which the fastener 81 is forced. Once inside of the spreader bar 59 the arms 81*a* of the fastener expand and prevent its subsequent withdrawal. The cord 80 is then pulled taut and knotted, drawing the webbing 70 downwardly into the desired dimple 70*a* to place the webbing 70 under longitudinal tension. The contour of the spreader bar 59 is designed to provide this dimpling technique, and also to assure that the weight of an occupant, when received on webbing 70, will not cause the latter to be extended to the point of contacting the bar 59 since such contact would result in discomfort to the occupant.

Alternatively, the dimpling may be effected by a spreader bar, such as the spreader bar 25 in the chair of FIGS. 1 to 10, attached at its opposite ends directly to the steel bands 66, received within a transverse pocket formed on the under surface of the webbing 70 and contoured to provide the desired dimpling effect.

*FIGS. 14 to 17*

In FIGS. 14 to 17, there is shown a contoured chaise lounge 90 constructed in accordance with a third embodiment of the invention. The chaise lounge 90 includes a base frame 91 and a body-supporting structure 92. The base frame 91 comprises a pair of front legs 93 and a pair of rear legs 94 (only one of the rear legs is shown). The front and rear legs 93 and 94 each include a longitudinally extending stud 95. A hollow longitudinal stretcher 96 receives within its opposite ends the longitudinal studs 95 of associated front and rear legs 93 and 94. The legs 93 and 94 and stretcher 96 together constitute one side frame of the base frame 91. The front pair of legs 93 are joined by a front lateral strecher 97 which may either be integrally molded with the legs 93 or may be a separate hollow bar joined to studs on the legs 93.

As described above, the longitudinal studs 95 and the longitudinal stretchers 96 are preferably of elliptical cross sections, the studs 95 being of relatively smaller dimensions to be received with the ends of the stretchers 96. The exterior dimensions of the stretchers 96 conform with the legs 93 and 94 to present a smooth or continuous surface at their juncture. The studs, such as 95, are provided with ribs to facilitate the fitting of the ends of a hollow crossbar, such as 96, thereover and to assure proper application of adhesive therebetween for securing the assembly of the base frame 91. The stud connections are similar to that described above and shown in FIG. 6.

The body-supporting structure 92 includes a pair of steel bands 100. The bands 100 are preformed to define the contour of the chaise lounge, which may be described, beginning at the front or left-hand end, as it appears in the drawing, as comprising: a downwardly depending lip portion 100*a*; an elongated upwardly convex portion 100*b*, which may serve as a leg support; an upwardly concave portion 100*c*; an upwardly slightly convex portion 100*d*, which cooperates with portion 100*c* to provide a torso support; a concave connection portion 100*e*; a backwardly inclined portion 100*f*, which may serve as a shoulder and head support; and a rearwardly extending lip portion 100*g* at the upper end of the head support.

A continuous length of webbing 101 extends between the bands 100 throughout their length. The webbing 101 includes a pair of pockets extending along its opposite longitudinal edges. The pockets are provided by strips 102 of a heavy material secured along their opposite longitudinal edges to the webbing 101, for example, by the rows of stitching 103. The steel bands 100 are received in the respective pockets.

The body-supporting structure 92 further includes a first arcuate stretcher bar 105 extending between, and joined to the steel bands 100 at the neck supporting portion **100*f* adjacent the curved section 100*e*, and a second arcuate stretcher bar 106 extending between, and joined to the steel bands 100 at a central portion of the arcuate section 100*c*. The arcuate stretcher bars 105 and 106 perform three functions in that (1) they hold the steel bands 100 in parallel, spaced relation to place the webbing 101 under lateral tension; (2) they provide fixed anchorage for the mechanism for dimpling the webbing 101, as at 101*a* and 101*b*, respectively, to place the webbing 101 under longitudinal tension; and (3) they serve as additional lateral stretchers in the base frame 91**.

Figures 14, 15, 17, 18:
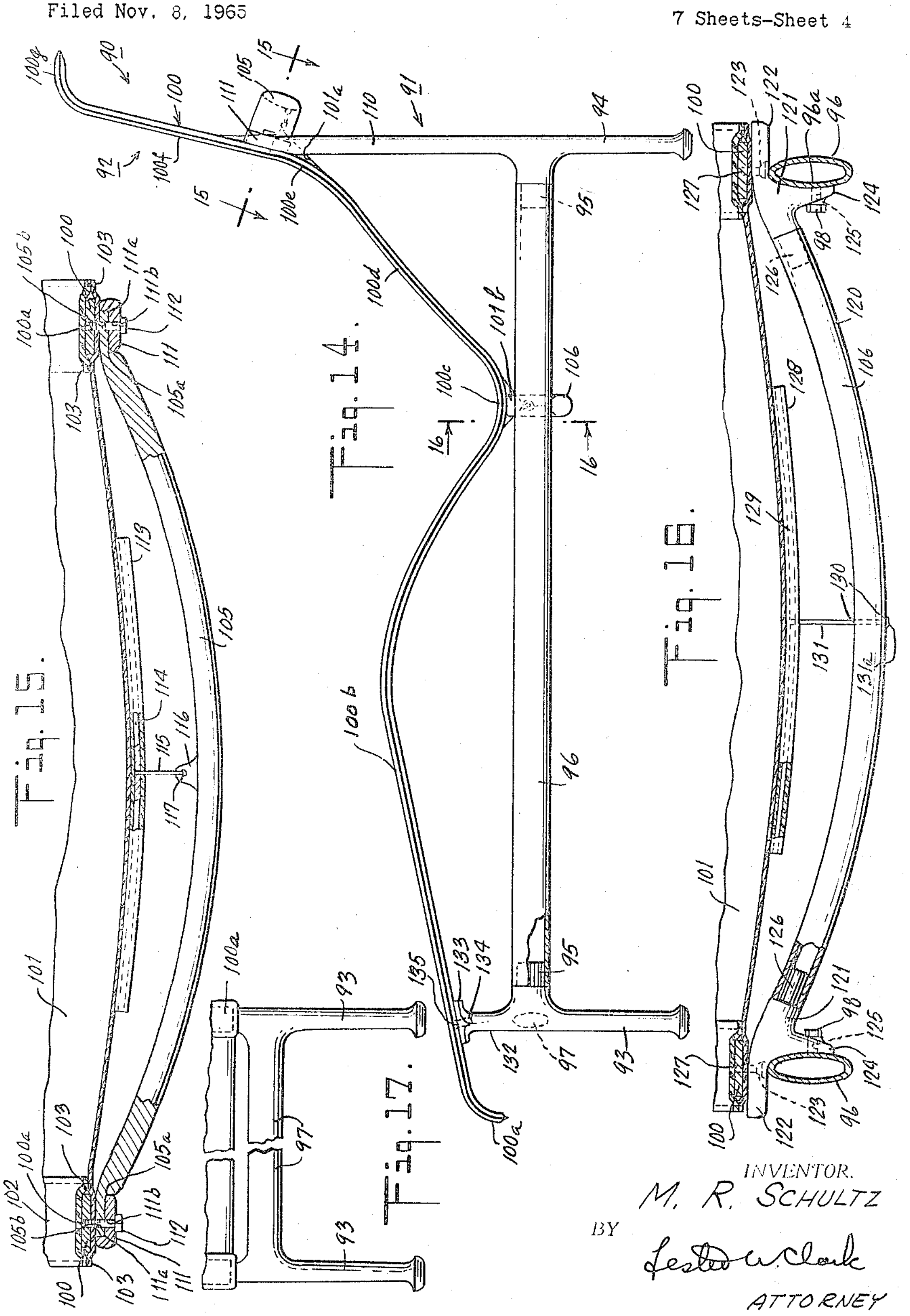
FIG. 14 is a side elevational view of a chaise lounge constructed in accordance with a third embodiment of the invention.
FIG. 15 is a sectional view taken on the line 15—15 of FIG. 14.
FIG. 17 is a fragmentary front elevational view of the chaise lounge of FIG. 14.
FIG. 18 is a side elevational view of a chaise lounge having an adjustable back and constructed in accordance with a fourth embodiment of the invention.
Figure 18:
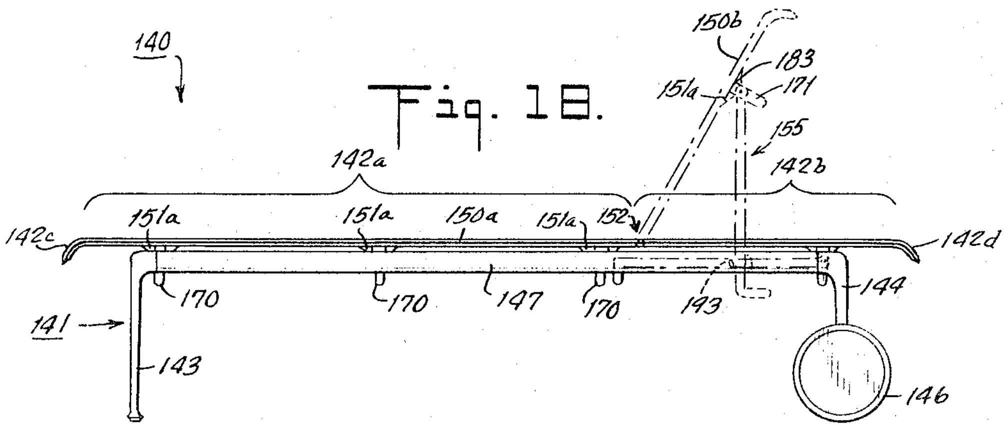
Figure 19:
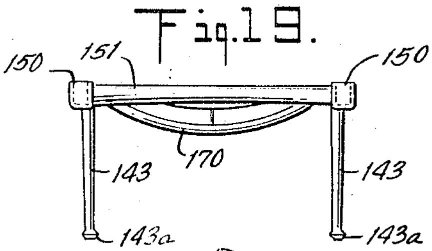
FIG. 19 is a front elevational view of the left-hand half of the chaise lounge of FIG. 18.
Figure 20:
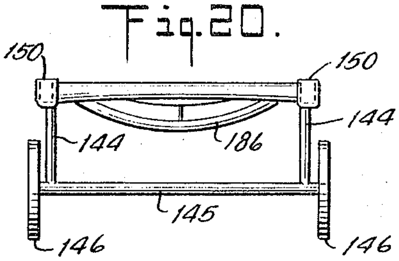
FIG. 20 is a rear elevational view of the right-hand half of the chaise lounge of FIG. 18.

With reference to FIGS. 14 and 15, the rear legs 94 include vertical extensions 110 having rearwardly inclined brackets 111 at the upper extremities thereof. The brackets 111 each include a recess **111*a* and an aperture 111*b*. The first arcuate stretcher bar 105 includes flattened end portions 105*a*, each matingly engaging the recess 111*a* of the inclined bracket 111 at the top extremity of an associated rear leg 94. Each end of the bar 105 includes an aperture 105*b* which is axially aligned with the aperture 111*b* of the bracket 111. Each of a pair of bolts 112 is inserted through associated, aligned apertures 105*b* and 111*b* and is received in threaded engagement with an aperture 100*a* in one of the steel bands 100, thereby securing the spreader bar 105 to the steel bands 100 and concomitantly securing the body-supporting structure 92 to the brackets 111 of the base frame 91. The spreader bar 105 maintains the steel bands 100 in substantially parallel, spaced relationship to place the webbing 101 under lateral tension and also maintains the vertical extension 110 of the rear legs 94 in spaced relationship to increase the rigidity of the base frames 91**.

A sleeve 113 is attached to the under surface of the webbing 101, as viewed in FIG. 15, extending transversely thereof for a substantial portion of its width. A steel rod 114 is preformed to the desired contour of the dimple **101*a* and is received in the sleeve 113. A flange 116, including an aperture 117, is provided on the inner surface of the spreader bar 105. A cord 115 is passed through an opening in the sleeve 113 and attached to the bar 114, and is passed through the aperture 117. The cord 115 is drawn tight and knotted, pulling the webbing 101 toward the spreader bar 105** to place it under longitudinal tension.

Referring to FIGS. 14 and 16, the spreader bar 106 includes a generally arcuate, hollow tube 120 and a pair of mounting brackets 121. Each of the mounting brackets 121 includes a first finger 122 having a countersunk aperture 123, a second finger 124 generally perpendicular to the finger 122 and having an aperture 125, and a stud 126. The studs 126 are of slightly smaller dimensions than the interior dimensions of the hollow tube 120 so that they may be received within the opposite ends of the tube 120. The tube 120 and the studs 126 are shown to be of circular cross section, although other cross sections would be equally suitable. The surfaces of the studs 126 are provided with ribs to facilitate the assembly and to provide spaces for receiving an adhesive for joining the tubes 120 to the brackets 121, in a manner as described above in connection with FIG. 6.

Screws 127 are received through the countersunk apertures 123 and engaged within threaded apertures provided in the steel bands 100 to secure the latter to the spreader bar 106. The second spreader bar 106 and its mounting brackets 121 therefore also serve to hold the steel bands 100 in spaced, parallel relationship for placing the webbing 101 under lateral tension.

A sleeve 128 is joined to the under surface of the webbing 101, extending transversely between the steel bands 100 for a substantial portion of the width of the webbing 101. A steel rod 129 is preformed to the desired contour of the dimple **101*b* in the webbing 101 and is received within the sleeve 128. Aligned apertures 130 are provided in the spreader bar 106. A cord 131 is passed through an opening in the sleeve 128 and secured to the steel bar 129 and passed through the apertures 130 and drawn tight and knotted, as indicated at 131*a*. The webbing 101 is thereby drawn toward the spreader bar 106 to form the dimple 101*b* and to place the webbing under longitudinal tension. The formation of the dimples 101*a* and 101*b* assures that the webbing 101 is maintained in the configuration defined by the steel bands 100**.

After connection of the spreader bar 106 to the steel bands 100, the mounting brackets 121 are nested onto the longitudinal stretchers 96 with the depending fingers 124 closely engaging the interior surface and the fingers 122 resting upon the top surfaces of the longitudinal crossbars 96. A threaded aperture **96*a* is provided on the inner wall of each stretcher 96. A bolt 98 is received through the aperture 125 in the second finger 124 of each mounting bracket 121 and engages the threaded aperture 96*a* to secure the mounting bracket 121 to one of the horizontal stretchers 96. It is apparent that the spreader bar 106 also serves a dual function: namely (1) maintaining the longitudinal crossbars 96 in spaced, parallel relationship to increase the rigidity of the base frame 91; and (2) serving as part of a dimpling attachment to hold the webbing 101** in longitudinal tension.

The front legs 93 include vertical extensions 132 having inclined mounting surfaces 133. Each of the surfaces 133 includes an aperture 134 for receiving a plug 135 which is secured to, and extends downwardly from the steel band 100. A fastener element is provided within the aperture 134, as hereinbefore described, to secure the plug 135 within the aperture 134.

The chaise lounge 90 particularly emphasizes the unique capacibilty afforded by the construction by the furniture of the invention of quickly and easily defining a desired contour for the body-supporting portion of the furniture. In addition to the simplicity and open, airy design enabled by this construction, the furniture is very comforable since the steel bands and the webbing provide a limited amount of resilience whereby the body supporting portion of the furniture conforms to the occupant's body. Both the body-supporting structure 92 and the base frame 91 are of sturdy and durable construction, assuring long life of the furniture.

*FIGS. 18 to 26*

In FIGS. 18 to 26, there is shown an adjustable chaise lounge constructed in accordance with a fourth embodiment of the invention. The chaise lounge 140 includes a base frame 141 and a body-supporting structure 142.

Referring to FIGS. 18 to 21, the base frame 141 includes a pair of front legs 143 and a pair of rear legs 144. The lower ends of the front legs 143 terminate in feet **143*a* which are adapted to rest upon a supporting surface. The lower ends of the rear legs 144 terminate in a hollow axle housing 145 in which a pair of wheels 146 are rotatably mounted by means of an axle structure described below. The axle housing 145 is secured to the rear legs 144, preferably by welding, and extends beyond the legs 144 to provide clearance for rotation of the wheels 146**.

Figures 21, 22:
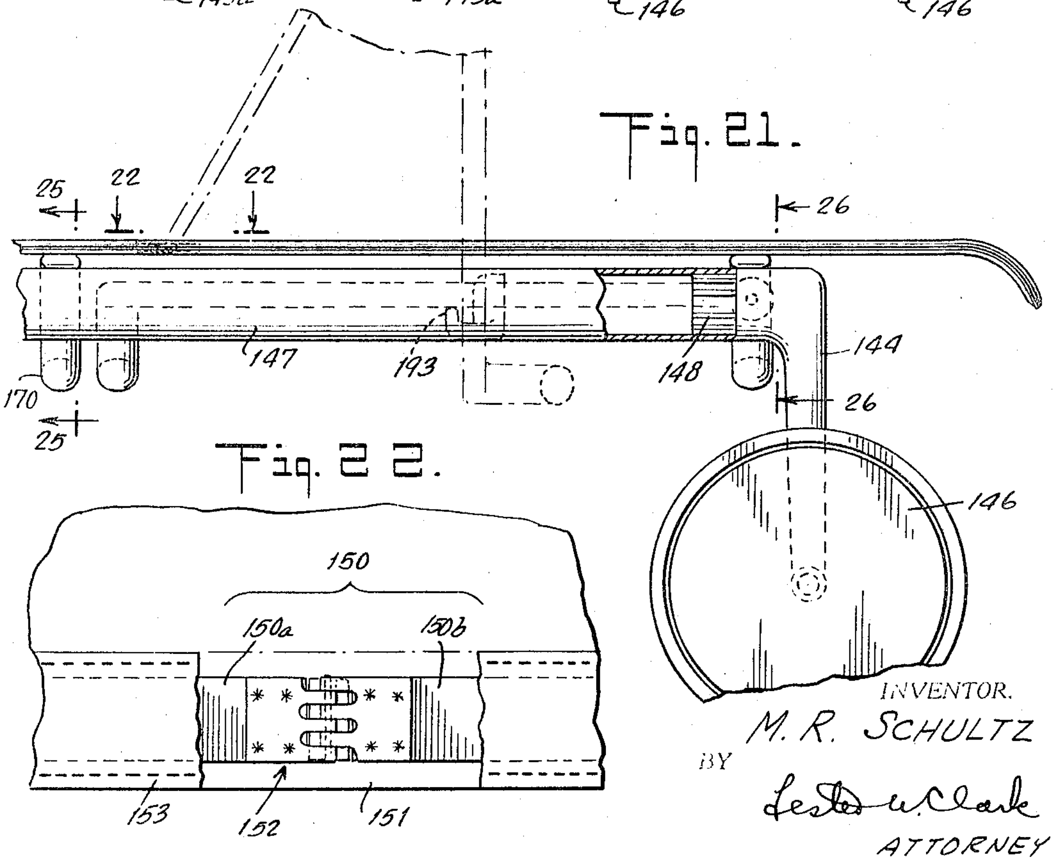
FIG. 21 is a fragmentary side elevational view of a rear portion of the chaise lounge of FIG. 18, showing on an enlarged scale features of the adjustable back support.
FIG. 22 is a fragmentary sectional view taken on the line 22—22 of FIG. 21, showing on an enlarged scale a hinge structure providing for operation of the adjustable back.

The base frame 141 further includes a pair of longitudinal stretchers 147 preferably formed of a hollow, straight length of tubing of elliptical cross section. Each of the front and rear legs 143 and 144 has at its upper end a horizontal extending stud 148, directed rearwardly from the front leg and forwardly from the rear leg. A longitudinal stretcher 147 is secured at its ends to a pair of opposed studs 148, and cooperates with the associated legs 143 and 144 to provide an integral side frame. As best shown in FIG. 21, by way of example, the rear leg 144 includes a stud 148 extending forwardly therefrom in axially aligned relationship with the stretcher 147, and thus in opposed relationship with a corresponding stud (not shown) on the front leg 143 of the same side of the frame. In accordance with the technique described above, the stud 148 has exterior dimensions slightly smaller than the interior dimensions of the crossbar tube 147 and is provided with ribs on its surface to facilitate receiving the end of the crossbar 147 over the stud 148 and to facilitate effective application of an adhesive therebetween.

The body-supporting structure 142 includes a pair of bands 150, preferably of nickel-plated steel, between which extends a continuous length of webbing 151. Horizontal pockets are formed along the opposite longitudinal edges of the webbing 151 by strips 153, of suitable material, e.g., leather, secured along their opposite longitudinal edges to the webbing 151, for example, by rows of stitching 154. The bands 150 are received within the pockets thus formed. The frame 142 includes a seat and leg supporting portion **142*a*; a back supporting portion 142*b*; a downward lip 142*c* at the front edge of the seat and supporting portion 142*a*; and a downward lip 142*d* at the rear, or top edge of the back supporting portion 142*b*. Each of the bands 150 is severed into sections 150*a* and 150*b* at the juncture of the leg portion 142*a* and the back portion 142*b*, and the sections 150*a* and 150*b* are joined by a hinge, generally identified by numeral 152. The hinges 152 and an adjustment mechanism 155 provide for adjusting the angle of inclination of the back supporting portion 142*b* relatively to the seat and leg supporting portion 142*a*, and thus relatively to the frame 141. The back support 142*b* may be raised from a normally horizontal position, shown in solid lines in FIG. 18, to a selected angular position, one position being as indicated in dotted lines in FIG. 18, at which position it is secured by the adjustment mechanism 155. The structure of the hinge 152 and the adjustment mechanism 155** will be described in detail hereinafter.

To maintain a smooth contour or surface of the strips 153 throughout their lengths, the hinges 152 must not produce any bulges or protrusions; further, the hinges 152 must not be significantly thicker than the bands 150 if they are to be received within the pockets formed between the strips 153 and the webbing 151.

Figures 23, 25, 26, 27:
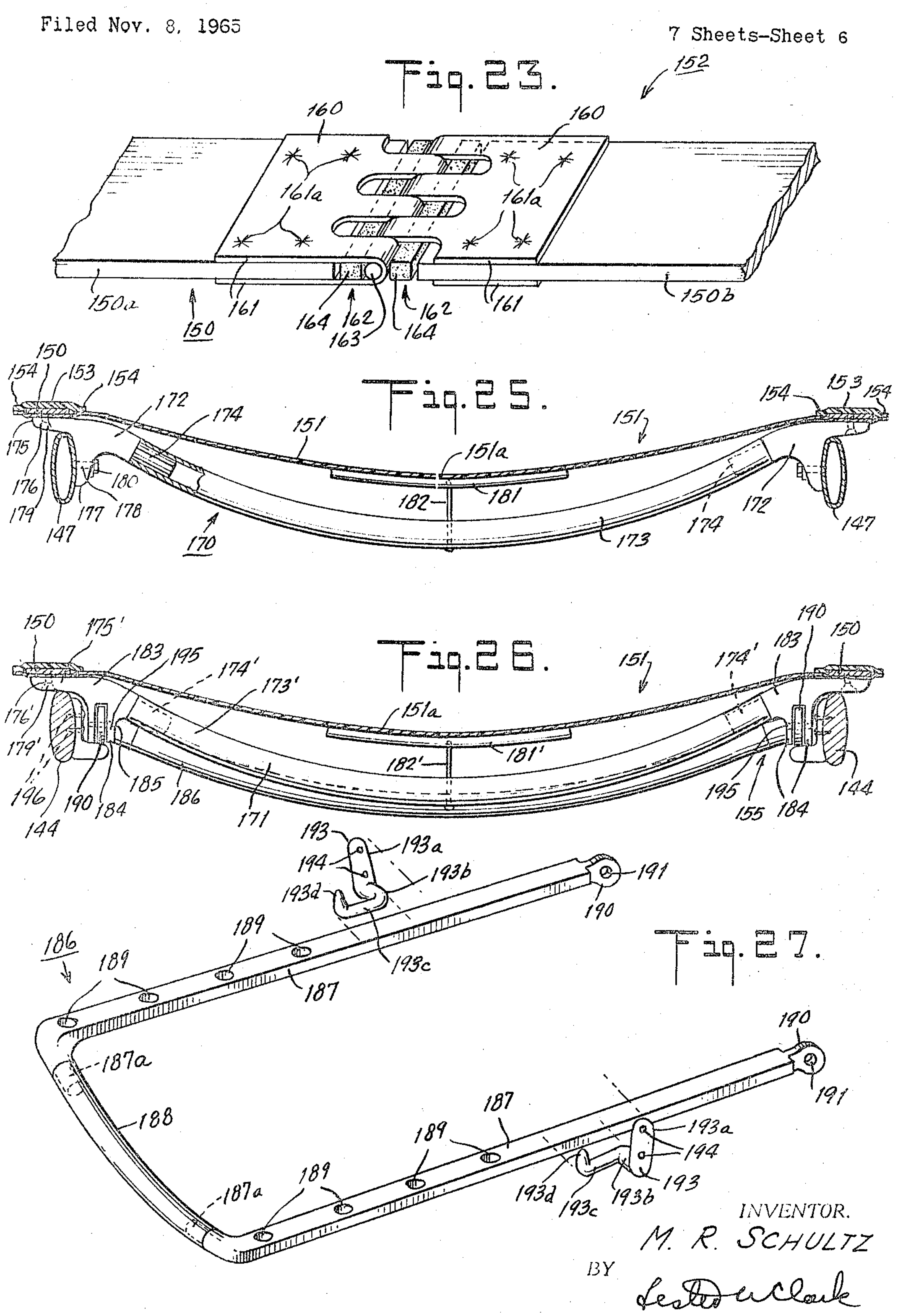
FIG. 23 is a perspective view of the hinge of FIG. 21.
FIG. 25 is a sectional view taken on the line 25—25 of FIG. 21.
FIG. 26 is a sectional view on the line 26—26 of FIG. 21 showing features of the adjustable back support.
FIG. 27 is an exploded perspective view of an adjustable yoke and latch arrangement employed in the adjustable back support of FIG. 21.

To satisfy these requirements of the hinge, a novel hinge has been developed, shown in its relationship to the webbing 151 and the strips 153 (the latter broken away to reveal the hinge structure) in FIG. 22 and in an enlarged, perspective view in FIG. 23. The hinge 152 is of the same width and only of slightly greater thickness than the steel bands 150. The hinge 152 joins the sections **150*a* and 150*b* of the steel bands 150 and is concealed within the pockets formed between the strips 153 and the webbing 151**.

Figure 24:
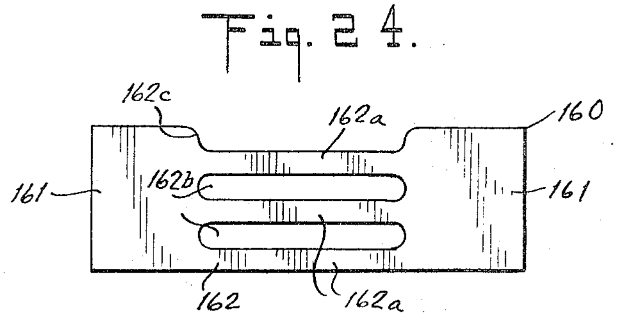
FIG. 24 is a view of a portion of the hinge of FIG. 22, prior to assembly.

The hinge 152 comprises a pair of mating leaves 160, each of which is formed, as by bending, into a U-shaped configuration. The leaves 160 are conveniently stamped from a flat sheet of stainless steel to have a pattern as shown in FIG. 24. Each leaf 160 includes solid legs 161 and a central portion 162. The central portion 162 includes strips **162*a* defining therebetween a plurality of elongated slots 162*b*. One edge of the central portion 162 is cut away, as indicated at 162*c***, to remove a longitudinal edge portion.

A pair of leaves 160 is bent into the U-shaped configurations shown in FIG. 23, and positioned on opposed ends of the band portions **150*a* and 150*b*. The legs 161 of each leaf 160 engage opposite sides of the associated band portion 150*a* or 150*b*, and are welded thereto, as indicated at 161*a*, and the central portion 162 of each leaf 160 projects beyond the end of its associated band. The flanges 160 are positioned in opposite relationship such that the strips 162*a* of one leaf 160 are projected matingly through the slots 162*b* of the other leaf 160, the mating, alternating arms 162*b* of the two leaves 160 thereby defining a substantially continuous cylindrical aperture. A pivot pin 163 is inserted through the aperture thus defined. Spacers 164 of generally rectangular configuration and of generally square cross section are fitted between the parallel portions of the strips 162*a* of each leaf 160, and between the end surface of the associated band portion 150*a* or 150*b* and the curved surface of the strips 162*b* of the other leaf 160 and the pin 163. The spacers 164** are of nylon or other wear-resistant, non-abrasive material.

The novel construction of hinge 152 satisfies an important requirement in addition to being flat and compact. Since the furniture of the invention is intended for outdoor use, it is necessary for maintaining its strength and appearance to assure against corrosion or rusting of any of its construction elements. Thus, the bands 150 must be protected. An obvious expedient is to make the steel bands 150 of stainless steel; however, the resulting cost is undesirably high and often prohibitive. It is preferable therefore, for economy of manufacture, to use steel bands plated with a non-corrosive metal such as nickel, as noted above. However, such plating materials can be removed by continued abrasion, resulting in corrosion of the underlying metal. Thus, in the hinge 152, abrasive or rubbing contact with the opposed ends of the band portions **150*a* and 150*b* must be prevented. The nylon spacers 164 prevent any such abrasive contact and therefore ensure against corrosion of the band portions 150*a* and 150*b*. Since the nylon spacers 164 and the stainless steel leaves 160 and pin 163 are not subject to corrosion in an outdoor environment, the hinge 152 and the bands 150** are protected against corrosion.

The body-supporting structure 142 further includes a plurality of spreader bars, including three spreader bars 170 of generally identical construction and a spreader bar 171 of a specialized construction and forming part of the back adjustment mechanism 155. The spreader bar 170 shown in FIG. 25 is of generally identical construction to the spreader bar 106 of FIG. 16 and includes a pair of mounting brackets 172 and a hollow, arcuate bar 173 joined at its opposite ends to studs 174 on each of the brackets 172 in the manner hereinbefore described.

Each of the brackets 172 includes a first finger 175 extending horizontally over the top surface of an associated longitudinal stretcher 147 and having an aperture 176 therein and a second, vertically depending finger 177 engaging the inner surface of the associated crossbar 147 and having an aperture 178 therein. A screw 179 is received in the aperture 176 and secured to the steel band 150 and a screw 180 is passed through the aperture 178 and secured to the longitudinal crossbar 147. The spreader bar 170 therefore serves to hold the steel bands 150 in spaced relationship to place the webbing 151 under lateral tension and also serves as a portion of the base frame 141 to rigidly hold the longitudinal crossbars 147 in spaced relationship. A sleeve 181 secured to the under surface of the webbing 151 and enclosing a contoured steel bar (not shown) and a cord 182 are provided for drawing the webbing 151 toward the spreader bar 170 to form a dimple **151*a* in the webbing 151 to place it under longitudinal tension. Any suitable connection of the webbing 151 to the spreader bar 170**, such as any of the other connections disclosed above, may be employed.

The specialized spreader bar 171 and portions of the adjutsment mechanism 155 are shown in the cross-sectional view of FIG. 26. Portions of the specialized spreader bar 171 which are identical to those of the spreader bar 170 are indicated by identical, but primed numerals. The spreader bar 171 includes a hollow tube 173' joined at its opposite ends to studs 174' of mounting brackets 183. The mounting brackets 183 further include first fingers 175' having apertures 176' through which screws 179' are received for securing the steel bands 150 to the brackets 183. The webbing 151 has a sleeve 181', attached to its lower surface, which is joined by a cord 182' to the spreader bar 171 to form a dimple 151a (FIG. 18) and place the webbing 151 under lateral tension.

The mounting brackets 183 further include second, downwardly depending, bifurcated fingers 184 having horizontal, aligned apertures 185 therein. The bifurcated fingers 184 provide for pivotal connection of a yoke 186 to the mounting brackets 183.

The yoke 186 is best shown in the perspective view of FIG. 27 and includes a pair of parallel legs 187 joined by an arcuate, hollow tube 188. The legs 187 include opposed, laterally extending studs 187a of reduced diameter over which are received the opposite ends of the hollow tube 188. The studs 187a preferably include ribs to facilitate receiving the ends of the tube 188 and the application of an adhesive therebetween for securing the ends of the tube 188 to the legs 187, in accordance with the technique described above.

The legs 187 include a plurality of elongated slots 189 in corresponding, spaced positions from the ends adjacent the studs 187a. The ends of legs 187 opposite the studs 187a are flattened, as at 190, the flattened ends 190 having aligned apertures 191 therein. The adjustment mechanism 155 further includes a pair of latches 193; each latch 193 includes a vertical mounting leg 193a having a pair of horizontal apertures 194, a horizontal, L-shaped extension having an inwardly directed leg 193b and a longitudinal leg 193c, and an upwardly extending pin 193d on the end of the leg 193c.

Referring again to FIG. 26, the flattened ends 190 on the legs 187 of the yoke 186 are received between the bifurcated fingers 184 of the respective mounting brackets 183. Pivot pins 195 are inserted through the apertures 191 and 185 of the associated flattened ends 190 and bifurcated fingers 184, respectively, and secured in position to pivotally join the yoke 186 to the brackets 183 and thus to the back supporting portion 142b. The latches 193 are secured by screws 196 which extend through the apertures 194 and into horizontally extending stretchers 147.

Referring to FIGS. 18, 21, 25 and 26, in the flat, or completely reclined position of the back support 142b, the legs 187 of the yoke 186 rest upon the hooks 193d on the L-shaped extensions of the latches 193. The brackets 183 rest on the forward extensions of legs 144. When the back 142b is raised to an inclined position, it pivots about the hinges 152, and the yoke 186 concomitantly pivots on the brackets 183, the legs 187 gliding along the hooks 193d. The location of the first pair of apertures 189 determines the minimum angle of inclination to which the back 150b may be raised and locked by slipping the hooks 193d through those apertures. To increase the inclination, the yoke 186 is released from the hooks, the back 142b is lifted further, pivoting on the hinges 152 and the yoke 186 further rotates about the brackets 183. The back 142b thus may be raised to and locked in any of a series of positions of increasing inclination, by engagement of the hooks 193d within successive ones of the apertures 189. The maximum inclination is determined by the lengths of the legs 187 and the location of the final pair of slots 189. The back 142b is shown in dotted lines in FIGS. 18 and 21 at a maximum inclination, the yoke 186 having rotated to a vertical position, and the last pair of apertures 189 being received over the hooks 193d.

The adjustment mechanism is very simple to operate and yet provides sturdy support for maintaining the back 150b at a selected one of a number of angular positions, in accordance with the desires of the occupant of the chair. In the flat position of the back 150b, the adjustment mechanism 155 is substantially concealed between the longitudinal crossbars 147. The arcuate contour of the tube 188 conforms closely to that of the spreader bars 170 and 171, thereby assuring that resilient depression of the webbing 151 will not cause the body of an occupant to touch the tube 188 with resultant discomfort.

Figure 28:
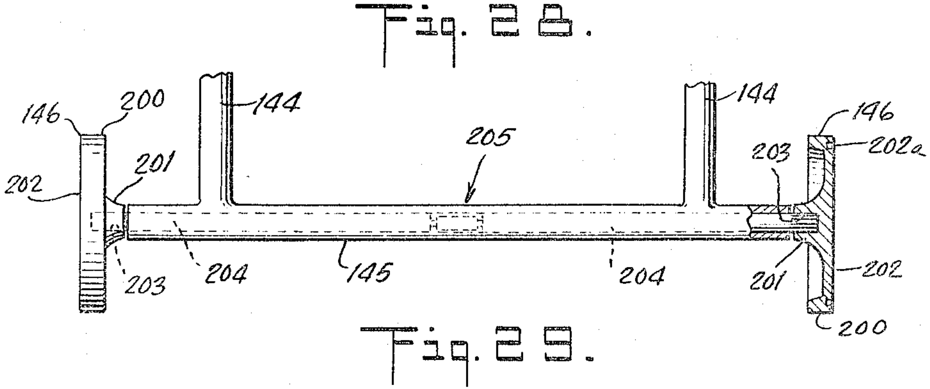
FIG. 28 is a fragmentary rear view, on an enlarged scale, of the rear axle housing and wheel mounting of the chaise lounge of FIG. 20.

In FIG. 28, there is shown an enlarged fragmentary view of the rear legs 144 and the axle housing 145, disclosing a novel wheel mounting for joining the wheels 146 to the housing 145. It is to be appreciated that any suitable wheel mounting may be employed in the alternative; however, the novel wheel mounting of the invention provides particularly desirable characteristics, facilitating the assembly of the chaise lounge 140 and improving its mobility.

The axle housing 145 is formed from a tube of circular cross section to which the rear legs 144 are welded at positions spaced inwardly from the ends of the tube 145. Each of the wheels 146 is formed by casting and includes a rim 200, a central, inwardly projecting hub 201, and an outer disc 202 joining the rim 200 and the hub 201. An annular recess 202a is formed in the disc 202 to provide a decorative effect, defining the rim 200. The hollow space between the rim 200 and the hub 201 is provided to save material and to lighten the weight of the wheels 146.

Each hub 201 includes a hollow, axially aligned cylindrical recess 203 within which is received an end of an axle 204. The axle 204 may be grooved or fluted on its surface adjacent one end to facilitate the insertion of the end into the recess 203 and the application of an adhesive, such as epoxy resin, between the axle 204 and the inner walls 201, in accordance with the technique described above. The axles 204 preferably are of approximately the same length and, when received within the axle housing 145, have their opposite free ends in opposed, spaced relationship. A novel slip-clutch 205 joins the opposed ends of the axle 204, preventing axial displacement thereof while permitting relative rotation therebetween.

Figure 29:
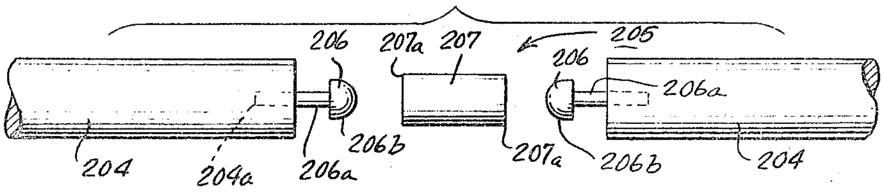
FIG. 29 is an enlarged, exploded view of the central part of the axle shown in FIG. 28.

The elements of the slip-clutch 205 are shown in an exploded view in FIG. 29. A round headed stud 206 including a shank 206a is secured to the free end of each of the axles 204. Although the shank 206a may be directly welded to the axle 204, preferably an axial recess 204a is provided in the axle 204 for receiving an end portion of the shank 206a. In accordance with the technique described above, the end portion of the shank 206a may be fluted or grooved to facilitate the application of an adhesive, such as an epoxy resin, between it and the walls surrounding the recess 204a to secure the stud 206 to the axle 204. The slip-clutch also includes a short length of hollow-resilient tubing 207. The tubing 207 is formed of a highly durable plastic or other material, such as nylon.

Figure 30:
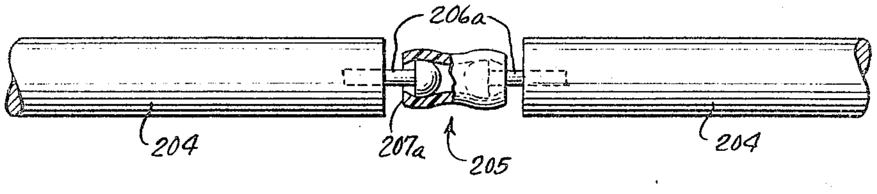
FIG. 30 is an enlarged view showing the axle elements of FIG. 29, assembled.

The assembled slip-clutch 205 is shown in FIG. 30. After the wheels 46 are assembled on the axles and the adhesive is dried, the tubing 207 is forced over the round head 206b of one of the studs 206 such that one end 207a of the tubing contracts over the rear edge of the head 206b. The axle 204 to which the tubing 207 has been connected is then inserted through the axle housing 145 from one end, and the other axle 204 is inserted through the housing 145 from its other end. The tubing 207 is held in axial alignment by its connection to the one stud 206. The other stud 206 engages the opposite end 207a of the tubing 207 and, by forcing the wheels 146 together, is inserted into the tubing 207. The other end 207a of the tubing 207 extends over and contracts about the rear edge of the round head 206a of the other stud 206 and thereby lockingly secures both of the studs 206 together.

The tubing 207 is forced over the first one of the studs 206 without a lubricant, externally of the axle housing 145. The other, or second stud 206, which must be inserted into the tubing 207 internally of the housing 145, preferably will have a lubricant applied to its head 206a. Due to the lubricant, the second stud 206 will be insertable into the tubing 207 with less force than that required to slide the tubing 207 further over the first, non-lubricated stud 206.

The slip-clutch 205 has many desirable features. In particular, it enables one wheel 146 to be rotated independently of the other wheel 146, since the studs 206 are free to rotate relatively to the tubing 207, and thus to each other. Due to the contraction of the ends 207*a* of the tubing over the rear edges of the heads 206*a* of the studs 206, the tubing prevents axial separation of the studs 206 and thus of the axles 204. The round heads of the studs 206, even if in contact, present only minimal frictional coupling of the axles 204. The inward movement of the axles 204 is stopped before engagement or contact of the hubs 203 of the wheels 146 with the ends of the housing 145, to assure free rotation of the wheels 146.

In accordance with the assembly of the invention, a close spacing between the hubs 203 and the axle housing 145 may be achieved without any concern as to binding between those parts.

In summary, each of the various embodiments of the invention includes the feature of forming separately a body-supporting structure and a base frame and securing the structure and the frame together in the final assembly of the furniture. It has been amply demonstrated that the construction of each of the frames is very simple and that the base and body-supporting structure may be assembled with ease. The furniture is structurally very strong and durable, assuring long usage. The provision of the independent body-supporting structure including preformed, contour-defining steel bands lends great versatility in designing the contour of the furniture and enhances both the appearance of the furniture and the comfort which the furniture offers to an occupant.

Numerous modifications and adaptations of the furniture of the invention and numerous features which it embodies will readily be apparent to those skilled in the art, and thus it is intended by the appended claims to cover all such modifications and adaptations which follow within the true spirit and scope of the invention.

What is claimed is:

1. An article of furniture comprising:
(a) a body-supporting structure including:
(1) a pair of elongated, stiffly flexible bands preformed to define the contour of said structure;
(2) webbing having a pair of elongated pockets, one along each of its longitudinal edges, for receiving an associated one of said bands;
(3) a spreader bar secured at its opposite ends to said bands to hold said bands in spaced relationship for placing said webbing under lateral tension; and
(4) said webbing being joined in a locality between said longitudinal edges to said spreader bar for placing said webbing under longitudinal tension, and
(b) a rigid base frame, said body-supporting structure being mounted on said rigid base frame.

2. An article of furniture as defined in claim 1 including:
(a) a sleeve attached to the undersurface of said webbing and extending laterally thereof; and
(b) said spreader bar is received in said sleeve to join the webbing to the spreader bar to place the webbing under said longitudinal tension.

3. An article of furniture as defined in claim 2 wherein said sleeve comprises a laterally extending portion of said webbing formed into a loop.

4. An article of furniture as defined in claim 1 including:
(a) a sleeve secured to said webbing and extending for a substantial portion of the distance between the opposite longitudinal edges of said webbing;
(b) a contoured rod received in said sleeve; and
(c) cord means connecting said rod to said spreader bar to join said webbing to said spreader bar, said cord means drawing said rod toward said bar and placing said webbing under longitudinal tension.

5. An article of furniture as defined in claim 1 wherein:
(a) each of said elongated pockets comprises:
(1) a narrow strip of material on one of the opposite longitudinal margins of said webbing, and
(b) means securing the longitudinal edges of the strip to said webbing.

6. An article of furniture as defined in claim 1 wherein said rigid base frame comprises:
(a) a pair of side frames, each of said side frames including a front leg and a rear leg joined by a longitudinal stretcher,
(b) said body-supporting structure is mounted on said base frame by securing said bands to said side frames,
(c) said front and rear legs of each side frame are of substantially equal height;
(d) said longitudinal stretcher extends generally horizontally between the top extremities of the associated front and rear legs of each side frame and provides an arm rest for said article of furniture;
(e) said base frame also includes:
(1) a front lateral stretcher extending generally horizontally between said front legs intermediate the heights thereof; and
(2) a rear lateral stretcher extending generally horizontally between said rear legs adjacent the upper extremities thereof,
(f) parts of said bands defining a back section which extends above said longitudinal stretchers, said bands being unsupported above said longitudinal stretchers.

7. An article of furniture as defined in claim 1, wherein said body-supporting structure is mounted on said rigid base frame by at least one connection comprising:
(a) an arm on a portion of said rigid base frame having an aperture extending therethrough and opening into a larger recess in an outer surface of said frame adjacent to a portion of an associated one of said bands,
(b) said associated band having a notch in the edge thereof adjacent said arm,
(c) a nut received within said notch and secured to said band in alignment with said aperture of said arm,
(d) a bolt received through said aperture in said arm and having an enlarged head received within said recess, said bolt engaging said nut to secure said band to said arm.

8. An article of furniture as defined in claim 1, wherein said body-supporting structure is mounted on said rigid base frame by at least one connection comprising:
(a) a vertical extension of said rigid base frame,
(b) said extension having a mounting surface at the upper extremity thereof and including a generally vertical recess therein; and
(c) a peg secured to one of said bands and extending downwardly therefrom and being received within said vertical recess with said band resting upon said mounting surface.

9. An article of furniture as defined in claim 6 wherein:
(a) each said band is preformed to define a seat section and a back section interconnected by an arcuate section,
(b) said spreader bar is secured at its opposite ends to said bands in said arcuate sections thereof to place said webbing under lateral tension, and
(c) first and second connections between each of said bands and a respectively associated side frame, said first connection being between an intermediate locality of the back section and the longitudinal stretcher adjacent the rear leg, and the second connection being between the seat section near the front thereof and the front horizontal stretcher.

10. An article of furniture as defined in claim 9 wherein:
(a) said spreader bar is contoured to extend downwardly and rearwardly between its opposite ends; and (b) a laterally extending portion of said webbing between said arcuate sections is connected to said spreader bar for placing said webbing under longitudinal tension.

11. An article of furniture as defined in claim 9 wherein each of said first connections comprises:

(a) a laterally extending arm on the associated longitudinal stretcher, said arm having a lateral aperture extending therethrough and opening into a larger recess in the outer surface of said stretcher;

(b) each said band having a notch in the edge thereof adjacent the associated arm;

(c) a nut received within said notch and secured to said band in axial alignment with said lateral aperture of said arm of said longitudinal crossbar; and (d) a bolt received through said aperture in said arm and having an enlarged head received within said recess, said bolt engaging said nut to secure said band to said laterally extending arm of said longitudinal stretcher.

12. An article of furniture as recited in claim 9 wherein:

(a) said front stretcher includes a pair of vertical extensions, said extensions being spaced inwardly of and adjacent said front pair of legs;

(b) each of said extensions having a mounting surface at the upper extremity thereof and including a generally vertical recess therein; and (c) said second connection includes a peg secured to said band and extending downwardly therefrom adjacent the front of said seat section, said peg being received within said recess and said band resting upon said mounting surface.

13. An article of furniture as defined in claim 1 wherein said rigid base frame comprises a pair of side frames, each of said side frames including a front leg and a rear leg joined by a longitudinal stretcher, and said body-supporting structure is mounted on said base frame by securing said bands to said side frames, and wherein:

(a) said front pair of legs is substantially shorter than said rear pair of legs;

(b) said longitudinal stretcher extends generally horizontally from said front leg adjacent the upper end thereof to said rear leg intermediate the ends thereof; and (c) said base frame further comprises a front lateral stretcher extending generally horizontally between said front legs; and (d) said spreader bar extends generally horizontally between said longitudinal stretchers adjacent said rear legs, and also serves as a rear lateral stretcher.

14. An article of furniture as recited in claim 13 wherein:

(a) said bands are preformed to define a seat section, a back section, an arcuate section joining said seat and back sections, and a rearwardly extending lip at the top of said back section;

(b) the upper end of each front leg has a generally horizontal mounting surface having a first, generally vertical recess therein;

(c) the upper end of each rear leg has a generally horizontal mounting surface having a second generally vertical recess therein;

(d) each of said longitudinal stretchers includes a third generally vertical recess therein adjacent said rear stretcher; and there are further provided (e) first, second and third pegs joined to each of said bands and extending downwardly from said seat section adjacent the front thereof, from the rearwardly extending lip, and from said seat section adjacent said arcuate section, respectively, said first, second and third pegs being received in locking engagement within said first, second and third recesses, respectively, to mount said body-supporting structure on said base frame.

15. An article of furniture as defined in claim 1 wherein said rigid base frame comprises a pair of side frames, each of said side frames including a front leg and a rear leg joined by a longitudinal stretcher, and said body-supporting structure is mounted on said base frame by securing said bands to said side frames, and wherein:

(a) said pair of bands is preformed to define in said body-supporting structure an arched leg supporting portion, an inclined back supporting portion, an arcuate portion joining said leg and back supporting portions, a neck supporting portion, and a curved portion joining said neck and back supporting portions;

(b) said spreader bar is joined to said bands in said arcuate portion of the body-supporting structure to place said webbing under lateral tension and the webbing in said arcuate section is connected to said spreader bar to place said webbing under longitudinal tension;

(c) said front legs are substantially shorter than said rear legs; and (d) said body-supporting structure is secured to said base frame at a first connection between said leg supporting portion of said structure and said front legs, at a second connection between said arcuate portion of said structure and said longitudinal stretchers, and at a third connection between said neck supporting portion of said structure and said rear legs.

16. An article of furniture as defined in claim 15 wherein said spreader bar includes:

(a) a pair of brackets on its opposite ends each having a generally horizontal first finger and a generally vertically depending second finger, said first and second fingers having apertures therein;

(b) securing means inserted through said apertures of said first fingers and engaging said bands; and (c) said second connection comprises securing means inserted through the apertures of said second fingers and engaging said longitudinal stretchers.

17. An article of furniture as defined in claim 15 including:

(a) a second spreader bar secured at its opposite ends to said bands in said neck supporting portion adjacent said curved portion and dimensioned to place said webbing under lateral tension; and (b) means connecting a second lateral portion of said webbing to said second spreader bar and dimensioned to place said webbing under longitudinal tension.

18. An article of furniture as recited in claim 17 wherein:

(a) said second spreader bar is flattened on its opposite ends, each flattened end having a transverse aperture therethrough;

(b) the upper end of each of said rear legs includes a mounting surface having a recess for matingly receiving an associated one of said flattened ends of said second spreader bar and an aperture therein for alignment with the transverse aperture of an associated flattened end of said second spreader bar; and (c) said third connection comprises said upper ends of said rear legs, said flattened ends of said spreader bars, and securing means inserted through said apertures and engaging said bands for securing the opposite ends of said second spreader bar to said bands and to said rear legs.

19. An article of furniture as defined in claim 1 wherein said rigid base frame comprises a pair of side frames, each of said side frames including a front leg and a rear leg joined by a longitudinal stretcher, and said body-supporting structure is mounted on said base frame by securing said bands to said side frames, and wherein:

(a) said front and rear pairs of legs are of substantially equal height and said longitudinal stretcher on each side frame extends between the upper ends of the associated front and rear legs;

(b) each of said bands includes separate leg and back supporting sections defining leg and back supporting portions in said body-supporting structure, said leg supporting sections of said bands being secured to said longitudinal stretchers;

(c) said body-supporting structure further includes:

1. a pair of hinges, each joining the adjacent ends of said leg and back supporting sections of one of said bands; and
2. a height adjustment mechanism including a yoke pivotally connected to said back supporting sections of said bands and having a plurality of latch engaging means selectively engageable which latch said base frame for supporting said back portion of said body at a selected one of a plurality of inclined positions relatively to said base frame.

20. An article of furniture as recited in claim 19 wherein said height adjustment mechanism further includes:

(a) a pair of arms on said yoke, each arm having a plurality of elongated slots therein;

(b) a pair of latches supported on the inner surfaces of said longitudinal stretchers; and (c) said elongated slots of said arms being receivable over said latches for releasably supporting said arms on said latches to maintain said back at a selected inclination.

21. An article of furniture as recited in claim 19 wherein said hinge comprises:

(a) first and second leaves, each of said leaves having a central portion intermediate two end portions;

(b) said central portion including at least one pair of elongated fingers defining elongated, spaced-apart apertures;

(c) each of said leaves being bent to a U-shaped configuration having parallel legs joined by an arcuate section, each of said parallel legs including one of said end portions and said fingers extending through at least said arcuate section;

(d) said parallel legs of each of said leaves in said U-shaped configuration being disposed on opposite sides of an associated one of said leg and back supporting sections of said bands and secured thereto and said arcuate fingers projecting beyond the end of said associated band portion;

(e) said arcuate fingers of one of said leaves being interdigitalized with the arcuate fingers of the other of said leaves and defining a substantially cylindrical aperture therebetween;

(f) a pin received through said cylindrical aperture; and (g) a pair of non-abrasive, wear-resistant spacers of elongated form, each of said spacers being received between the end of one of said band portions and said pin, and between the parallel legs of an associated leaf in said U-shaped configuration to prevent abrasion of the adjacent ends of said band portions.

22. An article of furniture as defined in claim 19, including:

(a) a hollow axle housing, said housing extending laterally and being joined adjacent its opposite ends to the bottom ends of said rear legs;

(b) a pair of studs, each of said studs having a shank and an enlarged head, said shank being axially mounted on a first end of an associated axle and said head projecting axially from said associated first axle end;

(c) said axles being received in said housing at opposite ends thereof with the respective studs toward each other to position said stud heads in closely spaced relationship; and (d) a resilient length of tubing, said tubing having an inner diameter slightly smaller than the diameter of said heads of said studs and an axial length greater than the sum of the projecting lengths of said studs;

(e) said tubing being received over said stud heads and the ends of said tubing resiliently contracted about said stud heads and toward said shanks, thereby confining said stud heads within said tubing for restraining separation of said axles and permitting relative rotation of said axles; and (f) wheels on the other ends of each of said axles.

References Cited by the Examiner

UNITED STATES PATENTS

| | | | |
|---|---|---|---|
| 1,693,564 | 11/1928 | Murphy et al. | 5—122 |
| 2,644,508 | 7/1953 | Weill | 297—218 |
| 2,666,241 | 1/1954 | Hall | 24—31 X |
| 2,667,916 | 2/1954 | Burd | 297—455 |
| 3,019,051 | 1/1962 | Nugent | 297—218 |
| 3,024,068 | 3/1962 | Eames | 297—457 |
| 3,041,109 | 6/1962 | Eames et al. | 297—449 |
| 3,120,407 | 2/1964 | Propst | 297—457 |
| 3,124,971 | 3/1964 | Peters et al. | 287—87 X |
| 3,167,352 | 1/1965 | Johnson | 297—452 X |
| 3,188,137 | 6/1965 | Sarvas | 297—218 |
| 3,222,108 | 12/1965 | Pablos | 297—441 |

References Cited by the Applicant

Deposit No. 32863 made on May 9, 1963, at the International Bureau for the Protection of Industrial Property in Switzerland, by Knoll International A.G., a corporation of Liechtenstein.

CASMIR A. NUNBERG, *Primary Examiner*.